United States Patent [19]
Steinthal et al.

[11] Patent Number: 5,963,369
[45] Date of Patent: Oct. 5, 1999

[54] DIGITAL SOLID-STATE BINOCULARS

[76] Inventors: Gregory Steinthal, 1074-7 Miramonte Dr., Santa Barbara, Calif. 93109; David W. Sherlock, 723B Colina La., Santa Barbara, Calif.

[21] Appl. No.: 08/939,541

[22] Filed: Sep. 29, 1997

Related U.S. Application Data

[63] Continuation-in-part of application No. 08/657,523, Jun. 3, 1996, abandoned.

[51] Int. Cl.[6] .............................. G02B 23/00; G02B 27/14
[52] U.S. Cl. ........................... 359/410; 359/407; 359/630
[58] Field of Search ...................................... 359/399–429, 359/480–482, 629–630; 348/42, 49, 53, 79, 220, 231; 386/109, 120, 125

[56] References Cited

U.S. PATENT DOCUMENTS 5,579,165  11/1996  Michel et al. ............................ 359/407
5,581,399  12/1996  Abe ........................................ 359/407

*Primary Examiner*—Thong Nguyen
*Attorney, Agent, or Firm*—Lyon & Lyon LLP

[57] ABSTRACT

A hand-held 3-D imaging system which incorporates the stereoscopic imaging system within a pair of binoculars. Each telescope optical system has a first optical system, a second optical system, and a third optical system. The first optical system allows for external magnified stereo viewing of an object. The second optical system allows for recording the magnified stereo image(s) viewed through the optics of the first optical system. The third optical system allows for reproduction of the magnified stereo image(s) captured by the second optical system. The hand-held 3-D imaging system further includes record and playback modes that are activated by switches connected to electronic processing circuitry located within the frame of the binoculars. The imaging system can also be designed to interact with external memory devices and/or displays.

21 Claims, 6 Drawing Sheets

DIGITAL SOLID-STATE BINOCULARS

RELATED APPLICATION DATA

This application is a continuation-in-part of U.S. Ser. No. 08/657,523 filed Jun. 3, 1996 now abandoned.

FIELD OF THE INVENTION

The present invention is in the field of hand-held stereoscopic imaging systems. The invention is a solid state stereoscopic imaging system integrated within a traditional hand-held pair of prism binoculars which allows for improved image enhancement and rugged component design.

BACKGROUND OF THE INVENTION

A pair of conventional binoculars is basically two small refracting telescopes held together by a frame that, by definition, produce a stereoscopic or three-dimensional view. Each refracting telescope has an optical path defined through an objective lens, a pair of prisms and an eye piece. The diameter of the objective lens determines the light-gathering power. The two objective lenses are further apart than the eyepeices, which enhances stereoscopic vision. Functioning as a magnifier, the eyepiece forms a large virtual image which becomes the object for the eye itself and thus forms the final image on the retina.

Recently, in U.S. Pat. No. 5,581,399, it is suggested that each telescope in a pair of binoculars be provided with an image sensor, a first optical system, a second optical system and a display so that the binoculars can selectively view optically projected images and electronically reproduced images that are stored by the binoculars. The display is a flat panel type liquid crystal display which appears transparent when optically projected images are viewed. When electronically reproduced images are to be viewed, a back light is pivoted behind the display from the eyepiece side. While such binoculars offer the advantage of limited storage and playback of images, they rely upon mechanical components which are subject to wear and failure. Further, because the display is located in the optical path, even though it appears transparent when the optical path is being used, the image quality is degraded, and brightness is lost, due to placement of the display in the optical path.

Accordingly, there is a need for improved stereoscopic imaging systems, especially for compact, solid-state (no moving parts that may wear down or easily damage with time) inexpensive systems yet high in performance. Further, the means for downloading stereo images from such a device to allow 3-D audience viewing has yet to be realized.

SUMMARY OF THE INVENTION

The present invention is generally directed to a hand-held 3-D imaging system that can be used for outdoor viewing yet still be used for digital photography or custom home 3-D viewing. A pair of hand-held prism binoculars is fitted with an integrated stereoscopic imaging system that can record and playback one or more images seen through the optics of the pair of binoculars. According to this invention, there is provided an additional optical system as seen over earlier prior art which allows a solid state design to be realized with improved image quality. A pair of binoculars has two refracting telescopes mounted on a single frame, and each of the refracting telescopes has an optical path defined through an objective lens, a pair of prisms and an eye piece. This is defined as the binocular system. Imaging sensors and emitters are placed perpendicular to the optical path of the binocular system so that one or more images can be converted to an electronic record signal during a record mode, electronically stored internally and/or externally and then converted back to one or more images from an electronic playback signal during a playback mode. The stereoscopic imaging system relies upon solid-state components for high durability and reliability at a low cost.

In a first, separate aspect of the present invention, each telescope is provided with a second optical system defined as the receiver system. The receiver system is comprised of receiver optics and the imaging sensor. The video information captured by the imaging system can be downloaded to an external accessory as digital information. The external accessory can be used to store additional images or to transfer the digital information to any existing imaging software package accepting the video format. Further, the two receiver systems can be genlocked or synchronized so that stereo video information can be transferred to an internal or external stereo multiplexor to form stereoscopic or 3-D image(s) that can be viewed to an audience on a TV or PC monitor.

In another, separate aspect of the present invention, each of the telescopes are provided with a third optical system defined as the transmitter system. The transmitter system consists of transmitter optics and the imaging emitter.

In still another, separate aspect of the present invention, the three optical system design allows for the need of only one optical component to be added to the binocular system to realize the integrated stereoscopic imaging system. This allows for enhanced image quality over prior art as the image viewed in stereo appears "brighter." If any additional optics were added along the optical axis of the binocular system as seen in prior art they would either reflect or absorb the visible light causing the image to become dim.

Yet another, separate aspect of the present invention, the three optical system design allows for a new and novel solid state design with no moving parts. Each system is independent of each other and requires no mechanical interaction.

In yet another, separate aspect of the present invention, information can be uploaded into the viewing device. This can be useful for scene interpretation and/or image recognition.

Accordingly, it is a primary object of the present invention to provide low cost prism binoculars with an integrated solid-state stereoscopic imaging system with improved image quality and allowance for 3-D viewing to an audience as seen over prior art.

This and further objects and advantages will be apparent to those skilled in the art in connection with the drawings and the detailed description of the preferred embodiment set forth below.

DETAILED DESCRIPTION OF THE PREFERRED EMBODIMENTS

Figure 1A:
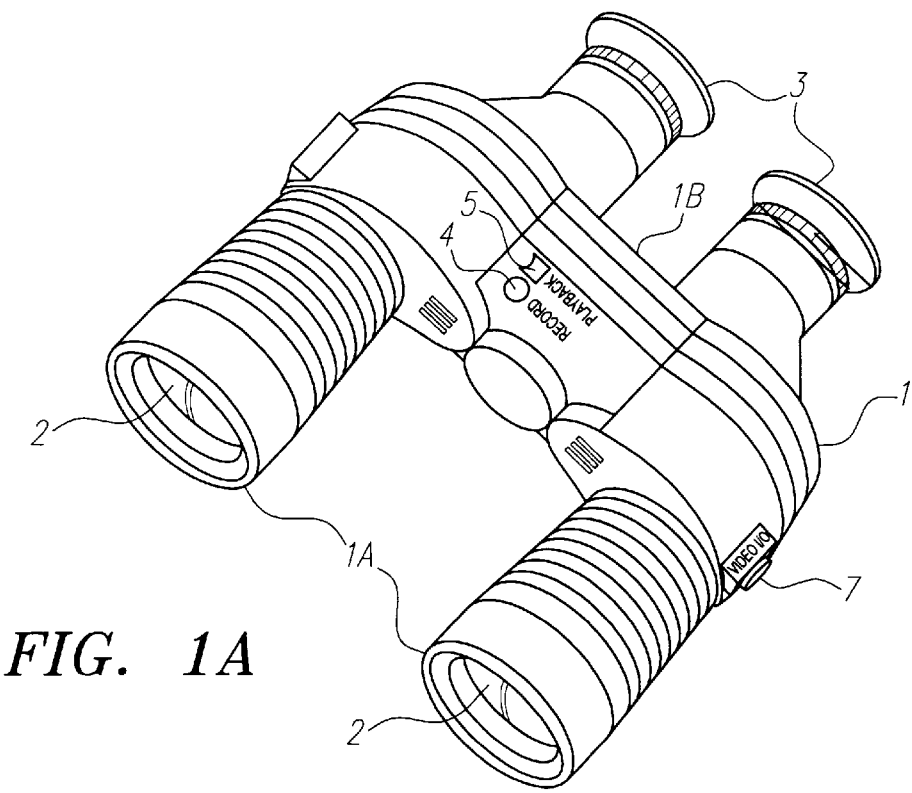
FIG. 1A illustrates the top view of the present invention showing the user accessible record and playback buttons.

Referring now to FIG. 1A, the complete package of the preferred embodiment looks very similar to today's hand-held binoculars 1. A pair of binoculars is basically two small refracting telescopes 1A held together by a frame 1B that, by definition, produce a stereoscopic or three-dimensional view. Each refracting telescope has an optical path defined through an objective lens 2, a pair of prisms 10 (shown in FIG. 2A) and an eyepieces 3. The diameter of the objective lens 2 determines the light-gathering power. The two objective lenses 2 are further apart than the eyepeices, which enhances stereoscopic vision. Functioning as a magnifier, the eyepiece 3 forms a large virtual image which becomes the object for the eye itself and thus forms the final image on the retina.

Taking advantage of the proven existing binocular design, the preferred embodiment integrates the imaging system within the package so that only a record 4 and playback 5 button are visible on the top view of the outside housing. The record button 4 allows the user to record any image(s) seen through said binoculars 1 and also allows simultaneous recording of stereo sound. Likewise, the playback button 5 allows the user to instantly (or at a later time) playback the stored images and the sound file as a "video clip" stereoscopically—or in other words, the images are played back simultaneously to each eye through the eyepiece 3.

Figure 1B:
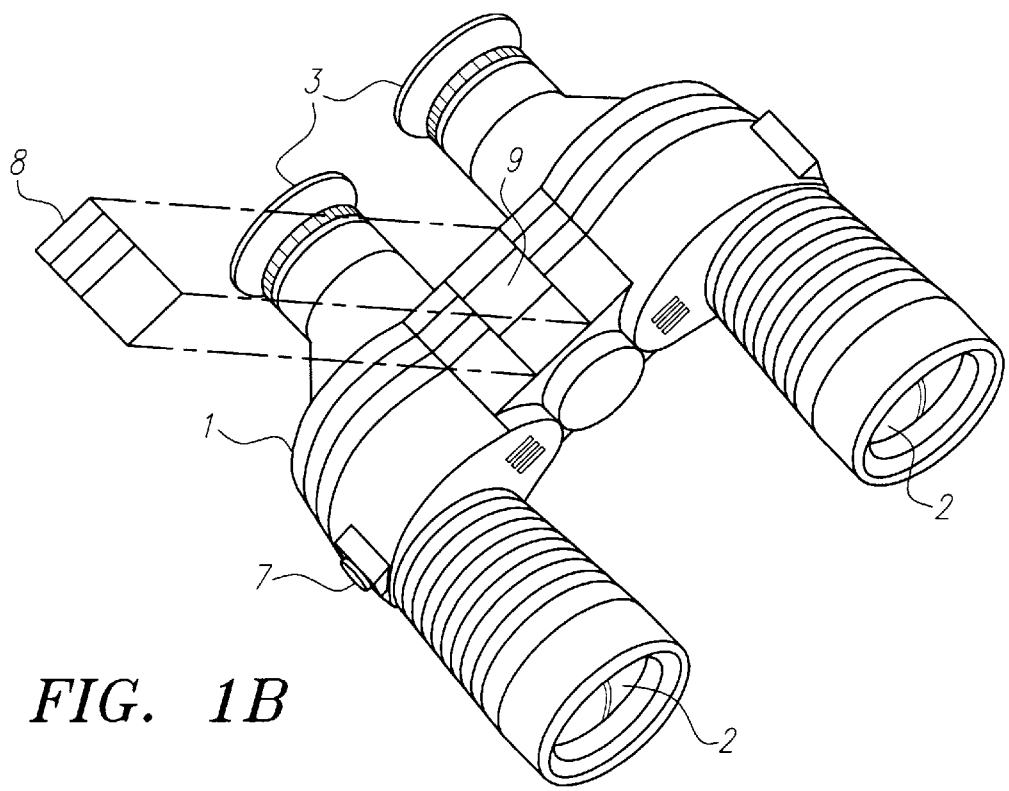
FIG. 1B illustrates the bottom view of the present invention showing an access door to an internal power supply.

Also visible on the outside package side view that differs from today's binoculars is a small 3 mm phone jack 7. This provides a digital video input/output to any external device accepting the video format. FIG. 1B depicts the bottom view in which a trap door 8 exists to house a battery 9 that is user accessible and needed to power the internal electronics and to retain the recorded images so that they can be viewed at a later time.

Figure 2A:
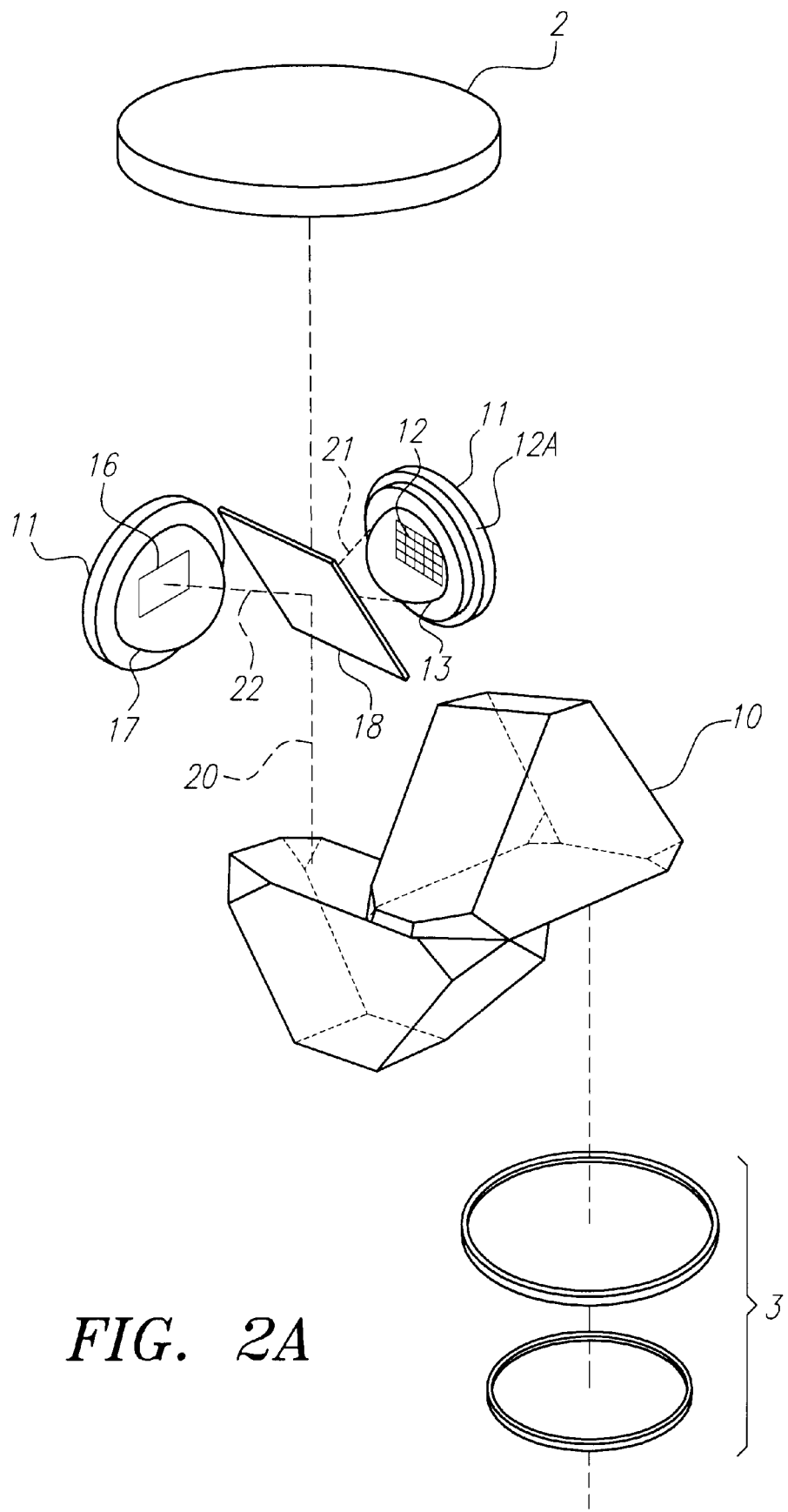
FIG. 2A is a ray trace diagrammatic illustration of the optical layout of the present invention.

FIG. 2A is an optical layout of one refracting telescope 1A of the preferred embodiment. Similar to existing binocular design, after the light 20 enters through the objective lens 2 it is bent by a pair of prisms 10 before passing through one or more additional optical components. The prisms 10 turn the image inverted by the objective lens 2 right side up again and allows the distance between the objective lenses 2 to be twice as far apart as that between the eyepieces 3, thus further enhancing the viewer's depth perception. The prisms also lengthen the light path 20 between the objective lens 2 and the eyepeice 3, which narrows the field of view and increases magnification in a short tube. The light beam 20 is then split by the beamsplitter 18 placed in the optical path between the objective lens 2 and the pair of prisms 10 to split a portion 21 of light 20 and direct it to a solid-state imaging sensor shown generally as 12A. The solid-state imaging sensor converts one or more images into an electronic record signal. In the preferred embodiment, the split portion 21 is focused by a lens 13 onto a photosensitive material 12. The photosensitive material 12 is a solid state device such as a CMOS photo array, although any other solid-state imaging sensor could also be used. The photo array 12 is a electronically controlled to capture any image or sequence of images at any point in time activated by the record button 4.

An active matrix liquid crystal display (AMLCD) 16 is electronically controlled and is activated by the playback button 5. During playback the AMLCD 16 is magnified by the magnifying lens 17 and the stored images displayed are transmitted at the beamsplitter 18 via light path 22 and then reflected off the beamsplitter 18 and into the eyepiece 3. The eyepiece 3 is a typical eyepiece used in existing binocular design in which the basic structure consists of two lenses 3 of the same glass separated by a distance equal to half the sum of their focal lengths. This provides magnification as well as reflection for lateral chromatic aberrations.

To summarize, the optical layout of FIG. 2A includes an objective lens 2 to gather the light, prisms 10 to increase magnification, and a beamsplitter 18 to split the light onto an imaging sensor 12A to store the image for later viewing. The recorded images displayed on the AMLCD 16 are magnified and then reflected off the same beamsplitter 18 and the eyepiece 3. Thus, only one optical component has been added to the traditional binocular optical axis system design. And the this optical component beamsplitter 18 is common to all three optical systems.

Figure 2B:
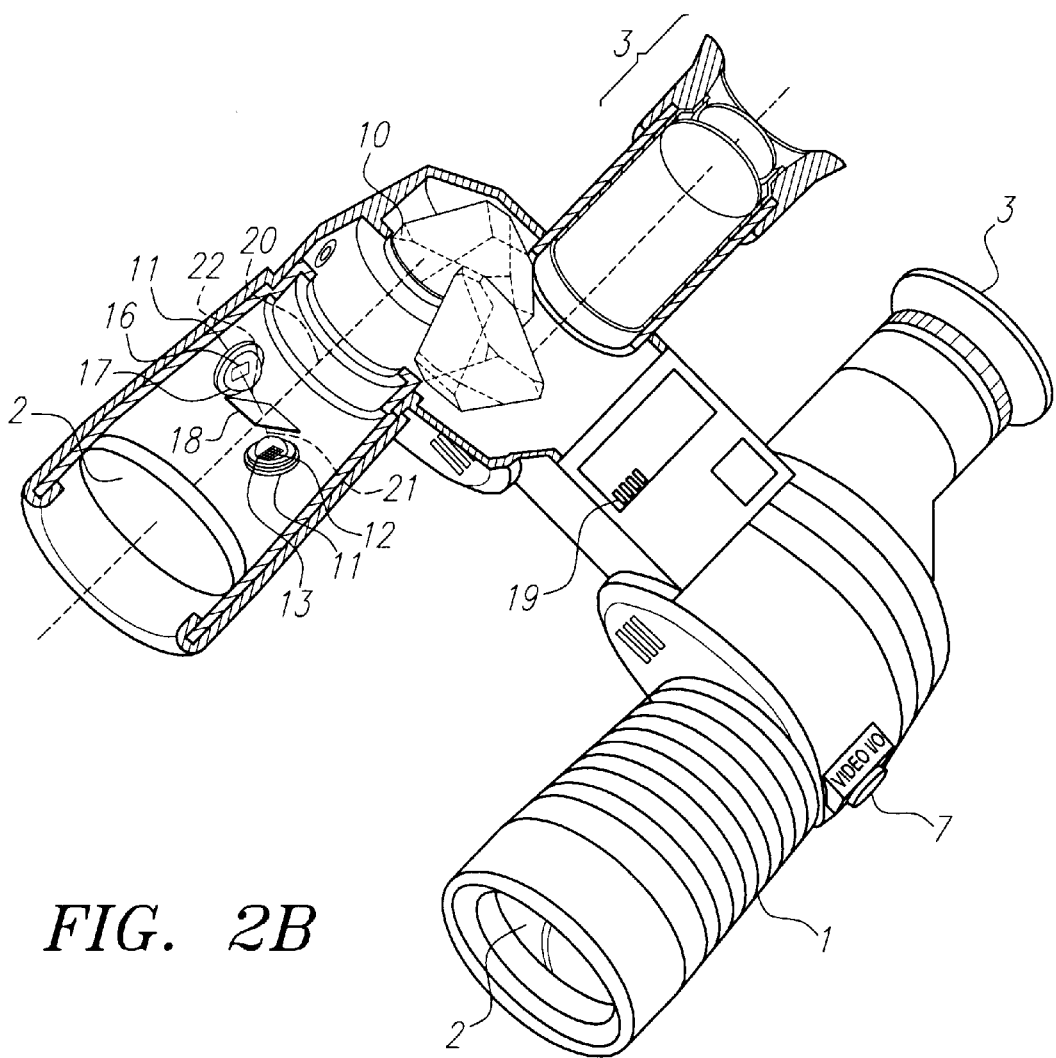
FIG. 2B is a fragmentary longitudinal sectional illustration of the present invention showing the two channels that give dissimilar views of the same picture to each eye providing a stereoscopic effect.

The optical layout of FIG. 2A is shown in FIG. 2B as the integrated solid-state stereoscopic imaging system of the preferred embodiment within today's hand-held binoculars 1. The optical layout of FIG. 2A is common to both refracting telescopes 1A to give the stereoscopic effect. The internal electronic processing circuitry 19 is shown to rest between the two refracting telescopes 1A on a printed circuit board located within frame 1B.

Figure 3:
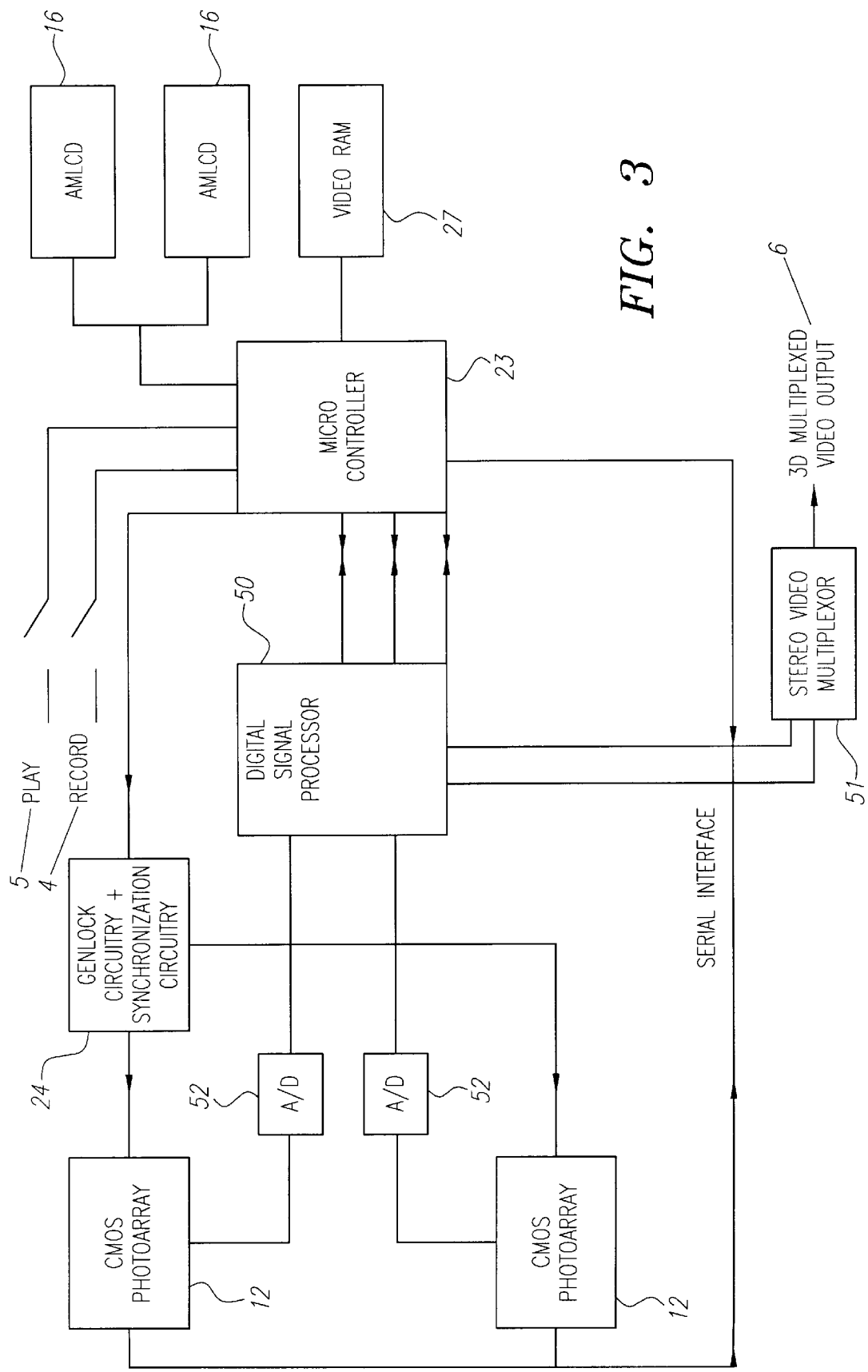
FIG. 3 is a schematized block diagram of an integrated imaging system.

FIG. 3 is a schematized block diagram of the electronic circuitry. The embedded micro-controller 23 is responsible for enabling/disabling the CMOS photoarrays 12, and the AMLCDs 16 are triggered by the record 4/playback 5 buttons, respectively. The video signal is digitized by the A/D converters, 52. The information is processed by the digital signal processor (DSP) 50. In order to view the magnified stereo image captured by the device to an audience, a field-sequential signal is provided 6. In field-sequential stereoscopic video, the left-eye image is stored in the odd video field, and the right image, in the even field (or vice-versa). In addition, since the two images are combined into one signal via the stereo video multiplexor 51, the left and the right images must always be "in sync." Thus the genlock and synchronization circuitry 24, plus the stereo video multiplexor 51, enable a composite video machine, i.e., a TV or PC monitor, to accept the two video signals simultaneously. The DSP 50 is also responsible for image compression before it is stored in video RAM 27. The DSP 50 also may have to be responsible for image stabilization if the binocular magnification power is high enough to cause any image distortions. A digital output 6 is provided containing the stereo video information.

Figures 4A, 4B:
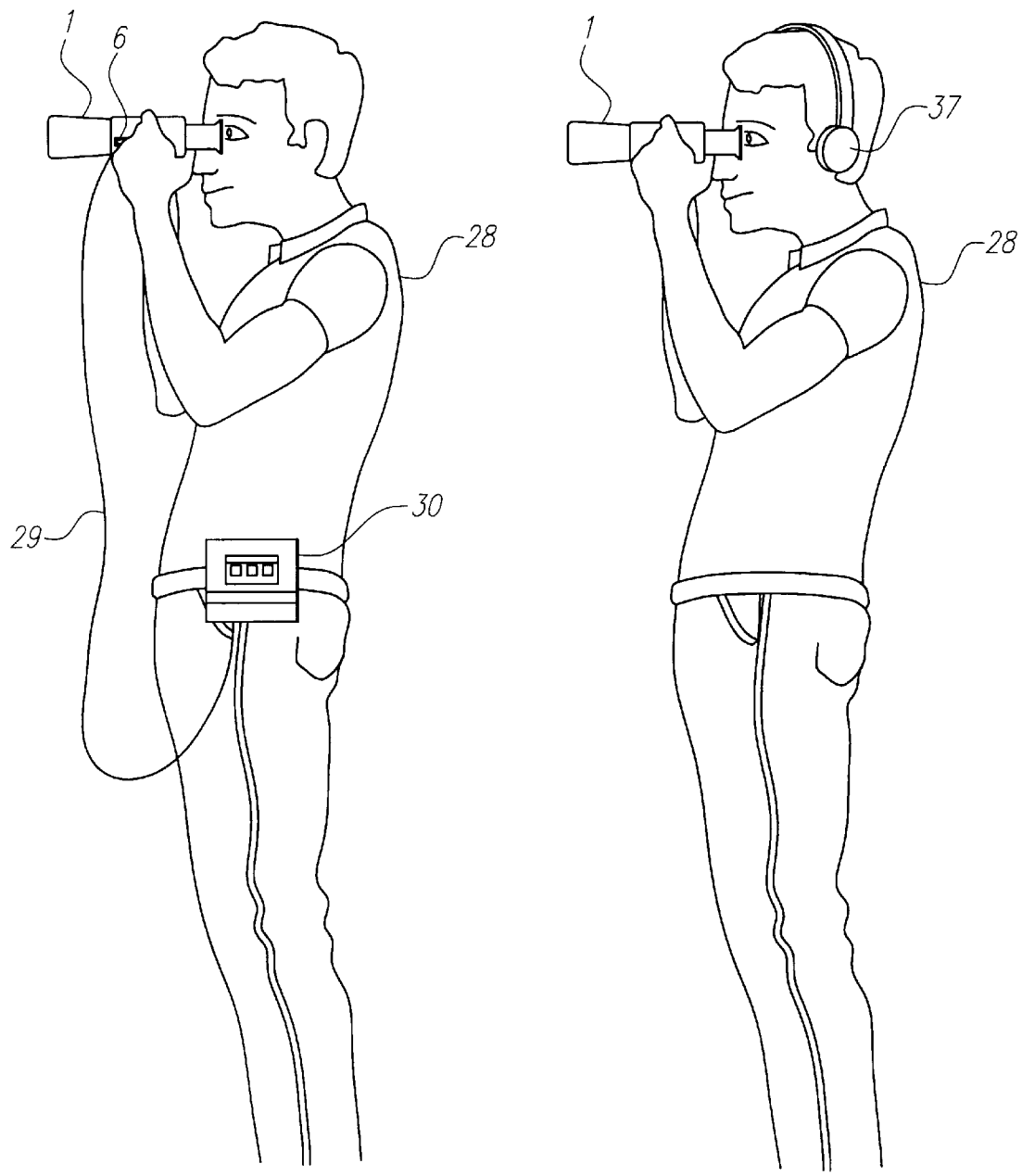
FIG. 4A is an illustration of the present invention downloading or uploading information to or from an external accessory.
FIG. 4B is an illustration of the present invention downloaded to headphones for playing back a 3-D video clip.

Another preferred embodiment is shown in FIG. 4A. User 28 is shown using integrated hand-held stereoscopic imaging system 1 to look out at the outside world. Upon request, the user 28 can store a limited amount of video image and can either playback the scene within the device 1 stereoscopically or store the information in an external device 30 by tying 29 the digital output 6 to the external device 30.

The external device 30 is basically a memory storage device. One disadvantage of the present device today is that there is limited amount of internal memory. This translates to a limited amount of video that can be store internally, at least until the capability of existing memory devices progresses such that this is no longer a problem. Accordingly, if the user wishes to store a series of different scenes, and the internal memory is not sufficient to store such scenes, the user can download the information to the external device 30 for later use.

Further information can be uploaded from the external device 30 to the imaging device 1 if so desired. The information may be overlaid so that the information is displayed while viewing the outside world or perhaps one channel views the outside world, while the other channel displays information for image recognition images. For example, while bird watching, an exotic bird may be displayed. It is conceivable the other channel can be uploading information from a library of exotic birds, so that a match can be made and the bird's identity would be known in real time.

FIG. 4B depicts the user 28 of the integrated hand-held stereoscopic imaging system 1 wearing headphones 37. In this mode the user is playing back the 3-D video clip.

Figure 5:
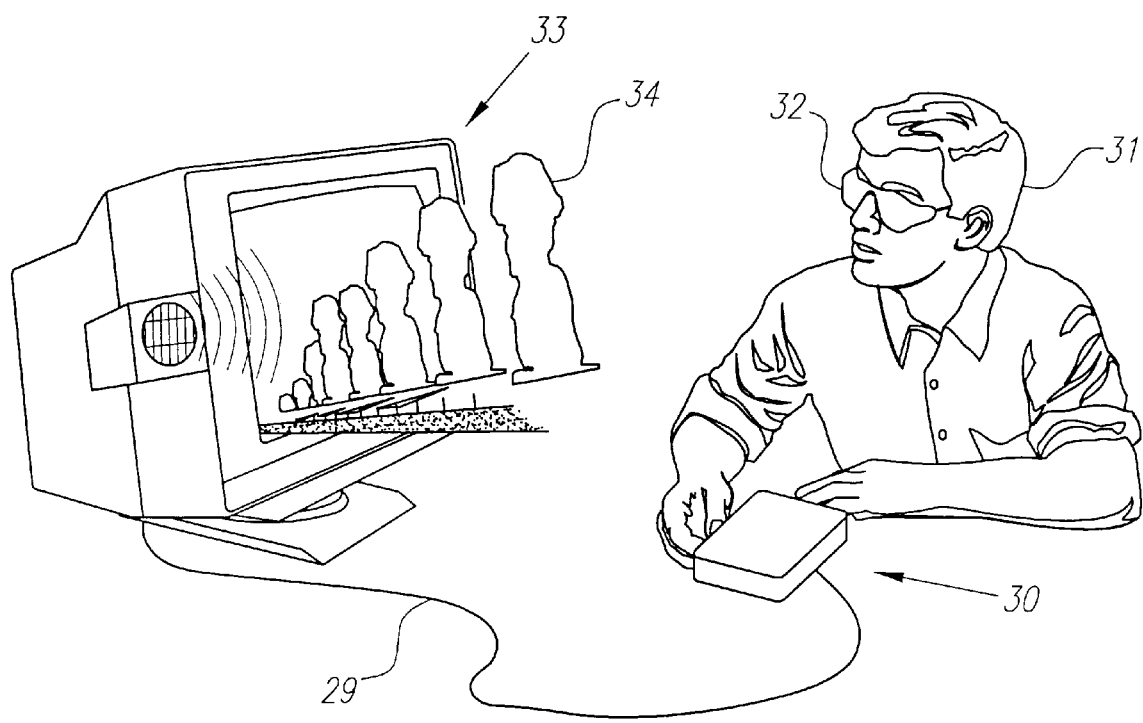
FIG. 5 is an illustration of the present invention downloaded to a PC and displayed in 3-D.

FIG. 5 is yet another preferred embodiment. The user 31 can take either the disclosed imaging device 1 or the disclosed external device 30, connect to any PC or monitor (television) 33. The genlocked video signals can be downloaded for 3-D audience viewing. Information is multiplexed 15 internally (now shown) or externally with a stereo multiplexor. The user 31 or a number of viewers must wear special glasses or polarizers 32 to view the video clip. The polarizers 32 separate the left image from the right image. The person's brain will attribute a sense of three dimensionality to the image 34 viewed because of the two similar but not identical images.

It will be readily apparent to those skilled in the art that still further changes and modification in the actual concepts described herein can readily be made without departing from the spirit and scope of the invention as defined by the following claims.

What is claimed is:

1. A hand-held 3-D imaging system, comprising:
   a pair of hand-held prism binoculars comprising two refracting telescopes mounted on a single frame, each of said refracting telescopes having an optical light path defined through an objective lens, a pair of prisms and an eyepiece;
   wherein each of the refracting telescopes further comprises:
      a beamsplitter placed in the optical light path between the objective lens and the eyepiece to split a portion of a light beam traveling through the optical light path;
      a solid-state imaging sensor system located outside of the optical light path which converts one or more images from the split portion of the light beam into an electronic record signal; and
      a solid-state imaging display emitter system located outside of the optical light path which converts an electronic playback signal into one or more emitted images which are transmitted to the eyepiece along a segment of the optical light path;
   a record control device for activating the solid-state imaging sensor system in each of the refracting telescopes to record;
   a playback control device for activating the solid-state imaging display emitter system to playback in each of the refracting telescopes;
   electronic storage media;
   electronic processing circuitry for processing the electronic record signal in each of the refracting telescopes and storing it as electronic data in the electronic storage media;
   electronic processing circuitry for retrieving electronic data stored in the electronic storage media and for processing it into the electronic playback signal which is sent to the solid-state imaging display emitter system in each of the refracting telescopes to create a stereoscopic image seen through the eyepiece of each of the two refracting telescopes; and
   wherein the beamsplitter is disposed between the objective lens, the eyepiece, the solid-state imaging sensor system, and the solid-state imaging display emitter system for simultaneously viewing objects and their recorded stereoscopic images emitted from the solid-state imaging display emitter system.

2. A hand-held 3-D imaging system as recited in claim 1, wherein the solid-state imaging sensor system is comprised of a lens which focuses the split portion of the light beam onto a solid-state imaging sensor.

3. A hand-held 3-D imaging system as recited in claim 1, wherein the solid-state imaging display emitter system is comprised of a solid-state imaging display emitter and a magnifying lens.

4. A hand-held 3-D imaging system as recited in claim 3, wherein the solid-state imaging display emitter comprises a liquid crystal display.

5. A hand-held 3-D imaging system as recited in claim 1, wherein one or more emitted images are transmitted from the solid-state imaging display emitter system to the beamsplitter before they are transmitted to the eyepiece along the segment of the optical light path.

6. A hand-held 3-D imaging system as recited in claim 1, wherein the beamsplitter is located along the optical light path between the objective lens and the pair of prisms.

7. A hand-held 3-D imaging system as recited in claim 1, wherein the solid-state imaging sensor system and the solid-state imaging display emitter system do not have any mechanically moving parts.

8. A hand-held 3-D imaging system as recited in claim 1, wherein the electronic record signal captures the entire field of view as seen through the pair of binoculars.

9. A hand-held 3-D imaging system as recited in claim 8, wherein the one or more emitted images transmitted to the eyepiece contains and displays all the information captured by the solid-state imaging sensor system.

10. A hand-held 3-D imaging system as recited in claim 1, further comprising genlock circuitry which enables the hand-held 3-D imaging system to output synchronized stereo images for 3-D viewing.

11. A hand-held 3-D imaging system as recited in claim 1, further comprising a power source contained within the pair of binoculars.

12. A hand-held 3-D imaging system as recited in claim 1, wherein the electronic processing circuitry for processing the electronic record signal and the electronic processing circuitry for retrieving electronic data is contained on a printed circuit board located between the two refracting telescopes.

13. A hand-held 3-D imaging system as recited in claim 1, wherein the electronic processing circuitry for processing the electronic record signal and the electronic processing circuitry for retrieving electronic data are controlled by an embedded micro-controller.

14. A hand-held 3-D imaging system as recited in claim 1, further comprising means for image stabilization if the binocular magnification power is high enough to cause image distortions.

15. A hand-held 3-D imaging system as recited in claim 1, further comprising means for inputting a digital video input signal into the hand-held 3-D imaging system so that it can be viewed as a stereoscopic video signal through the eyepieces of each of the two refracting telescopes.

16. A hand-held 3-D imaging system as recited in claim 1, further comprising a stereo video multiplexor for real-time 3-D viewing of an object.

17. A hand-held 3-D imaging system, comprising:

a pair of hand-held prism binoculars comprising two refracting telescopes mounted on a single frame, each of said refracting telescopes having a first optical system for viewing objects through the telescope along a first optical light path defined through an objective lens, a pair of prisms and an eyepiece;

wherein each of the refracting telescopes further comprises:
  a beamsplitter placed in the first optical light path between the objective lens and the eyepiece to split a portion of a light beam traveling through the first optical light path;
  a second optical system which converts one or more images from the split portion of the light beam into an electronic record signal through the use of a solid-state imaging sensor system located outside of the first optical light path in a second optical light path defined through the objective lens, the beamsplitter and the solid-state imaging sensor system; and
  a third optical which converts an electronic playback signal into one or more emitted images which are transmitted to the eyepeice along a segment of the first optical light path through the use of a solid-state imaging display emitter system located outside of the first optical light path in a third optical light path defined through the solid-state imaging display emitter system, the beamsplitter and the eyepiece;

a record control device for activating the solid-state imaging sensor system in each of the refracting telescopes to record;

a playback control device for activating the solid-state imaging display emitter system to playback in each of the refracting telescopes;

electronic storage media;

electronic processing circuitry for processing the electronic record signal in each of the refracting telescopes and storing it as electronic data in the electronic storage media; and electronic processing circuitry for retrieving electronic data stored in the electronic storage media and for processing it into the electronic playback signal which is sent to the solid-state imaging display emitter system in each of the refracting telescopes to create a stereoscopic image seen through the eyepiece of each of the two refracting telescopes;

an internal stereo multiplexor for real-time 3-D viewing of objects in communication with either the electronic processing circuitry for processing the electronic record signal or the electronic circuitry for retrieving electronic data; and wherein the second and the third optical systems do not have any mechanically moving parts.

18. A hand-held 3-D imaging system as recited in claim 17, further comprising genlock circuitry which enables the hand-held 3-D imaging system to output synchronized stereo images for 3-D viewing.

19. A hand-held 3-D imaging system as recited in claim 17, wherein the second and third optical systems do not require any additional optical element to be located in the first optical light path except for the beamsplitter.

20. A hand-held 3-D imaging system as recited in claim 17, wherein the beamsplitter is disposed between the objective lens, the eyepiece, the solid-state imaging sensor system, and the solid-state imaging display emitter system for simultaneously viewing objects and their recorded stereoscopic images reflected off the beamsplitter.

21. A hand-held 3-D imaging system as recited in claim 20, wherein the second and third optical systems do not require any additional optical element to be located in the first optical light path except for the beamsplitter.

* * * * *